United States Patent
Serkh et al.

(10) Patent No.: US 6,834,228 B2
(45) Date of Patent: Dec. 21, 2004

(54) BELT DRIVE SYSTEM WITH AUTOMATIC BELT TENSION CONTROL

(75) Inventors: Alexander Serkh, Troy, MI (US); Imtiaz Ali, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 354 days.

(21) Appl. No.: 10/040,317

(22) Filed: Oct. 25, 2001

(65) Prior Publication Data

US 2003/0083803 A1 May 1, 2003

(51) Int. Cl.[7] .............................. G06F 19/00; G06G 7/70
(52) U.S. Cl. ...................... 701/115; 701/101; 701/102; 701/114; 123/195 A
(58) Field of Search .......................... 701/37, 59, 101, 701/102, 114, 115; 123/195 A

(56) References Cited

U.S. PATENT DOCUMENTS

| | | | |
|---|---|---|---|
| 3,923,151 A | 12/1975 | Weber .................... 198/203 |
| 4,355,991 A | 10/1982 | Kraft ........................ 474/110 |
| 4,458,318 A | * 7/1984 | Smit et al. .................. 701/51 |
| 4,478,595 A | 10/1984 | Hayakawa et al. ......... 474/109 |
| 4,982,822 A | * 1/1991 | Petzold et al. ............. 192/3.58 |
| 5,085,104 A | * 2/1992 | Kouno et al. ............... 477/40 |
| 5,089,964 A | * 2/1992 | Morishige et al. ............ 701/51 |
| 5,243,881 A | * 9/1993 | Hayashi ...................... 477/45 |
| 5,641,058 A | 6/1997 | Merten et al. ......... 198/810.04 |
| 6,126,512 A | 10/2000 | Chao et al. ................ 451/9 |
| 6,249,728 B1 | 6/2001 | Streiter ..................... 701/37 |

FOREIGN PATENT DOCUMENTS

| | | | |
|---|---|---|---|
| DE | 35 02 664 A1 | 7/1986 | .......... G05D/15/01 |
| DE | 44 13 321 | 10/1995 | .......... E21C/35/04 |
| EP | 0 676 537 | 10/1995 | .......... F02B/67/06 |
| EP | 1 092 103 | 4/2001 | ............ F16H/7/08 |
| JP | 01310125 | 12/1989 | .......... F02B/67/06 |
| JP | 2001-059555 | 3/2001 | |

* cited by examiner

*Primary Examiner*—Willis R. Wolfe
*Assistant Examiner*—Johnny Hoang
(74) *Attorney, Agent, or Firm*—J. A. Thurnau, Esq.; C. H. Castleman, Esq.; S. G. Austin, Esq.

(57) ABSTRACT

The invention comprises a belt drive system for automatically controlling a belt tension. The system comprises an actuator controlled by a control module. The actuator operates on a pivoted pulley. A belt is trained about the pivoted pulley as well as other pulleys driving various accessories. A series of sensors in the system detect a belt condition including a belt tension. Sensor signals are transmitted to the control module. The control module processes the signals and instructs the actuator to move the pivoted pulley, thereby increasing or decreasing a belt tension. A feedback loop from the sensors to the control module allows the belt tension to be continuously monitored and adjusted many times per second. The system may actively control a belt tension by anticipating a system condition to prevent a belt noise by comparing sensor signals to instructions stored in a control module memory.

15 Claims, 2 Drawing Sheets

BELT DRIVE SYSTEM WITH AUTOMATIC BELT TENSION CONTROL

FIELD OF THE INVENTION

The invention relates to belt drive systems and more particularly to engine belt drive systems having automatic belt tension control.

BACKGROUND OF THE INVENTION

Most engines used for automobiles and the like include a number of belt driven accessory systems that are necessary for the proper operation of the vehicle. The accessory systems may include an alternator, air conditioner compressor and power steering pump.

The accessory systems are generally mounted on a front surface of the engine. Each accessory having a pulley mounted on a shaft for receiving power from some form of belt drive. In early systems, each accessory was driven by a separate belt that ran between the accessory and the crankshaft. With improvements in belt technology, single serpentine belts were developed and are now used in most applications. Accessories are driven by a single serpentine belt routed among the various accessory components. The serpentine belt is driven by the engine crankshaft.

Since the serpentine belt must be routed to all accessories, it has generally become longer than its predecessors. To operate properly, the belt is installed with a pre-determined tension. As it operates, it may stretch slightly. This results in a decrease in belt tension, which may cause the belt to slip. Consequently, a belt tensioner is used to maintain the proper belt tension as the belt stretches during use. A belt tension may be controlled by movement of pulleys as well as through the use of tensioners.

Control systems are known which allow a user to adjust a belt tension during operation of the system. These systems generally use a cylinder or other mechanical device to adjust a drive wheel position. The control system may also adjust a belt tension in response to belt speed.

Representative of the art is Japanese Publication No. 2001-059555 to Denso which discloses a belt transmission system to control slipping of a belt by computing a slip factor from a detection value from a first and second tachometer, the first tachometer detecting an engine speed and the second tachometer detecting an auxiliary module speed.

Also representative of the art is U.S. Pat. No. 5,641,058 (1997) to Merten er al. which discloses a invention which employs pressure and displacement sensors for the automatic monitoring and adjustment of endless belts by movement of drive and return wheels.

The prior art does not allow active control of belt tension to reduce belt slip while increasing belt life by setting a low belt tension when low tension is all that is required, but increasing tension momentarily and temporarily when such is necessary during transient conditions to prevent belt slip and associated noise.

What is needed is a belt tension control system having sensors for detecting a. belt operating condition. What is needed is a belt tension control system having a control module for using belt operating condition signals to actively control an actuator. What is needed is a belt tension control system for increasing a belt life by actively controlling a belt tension. What is needed is a belt tension control system capable of anticipating and preventing a belt slip noise event. The present invention meets these needs.

SUMMARY OF THE INVENTION

The primary aspect of the invention is to provide a belt tension control system having an actuator controlled by a control module for moving a pivoted pulley to adjust a belt tension.

Another aspect of the invention is to provide a belt tension control system having sensors for detecting a belt operating condition.

Another aspect of the invention is to provide a belt tension control system having a control module for using belt operating condition signals to actively control an actuator.

Another aspect of the invention is to provide a belt tension control system for increasing a belt life by actively controlling a belt tension.

Another aspect of the invention is to provide a belt tension control system capable of anticipating and preventing a belt slip noise event.

Other aspects of the invention will be pointed out or made obvious by the following description of the invention and the accompanying drawings.

The invention comprises a belt drive system for automatically controlling a belt tension. The system comprises an actuator controlled by a control module. The actuator operates on a pivoted pulley. A belt is trained about the pivoted pulley as well as other pulleys driving various accessories. A series of sensors in the system detect a belt condition including a belt tension. Sensor signals are transmitted to the control module. The control module processes the signals and instructs the actuator to move the pivoted pulley, thereby increasing or decreasing a belt tension. A feedback loop from the sensors to the control module allows the belt tension to be continuously monitored and adjusted many times per second. The system may actively control a belt tension by anticipating a system condition to prevent a belt noise by comparing sensor signals to a system model stored in a control module memory.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
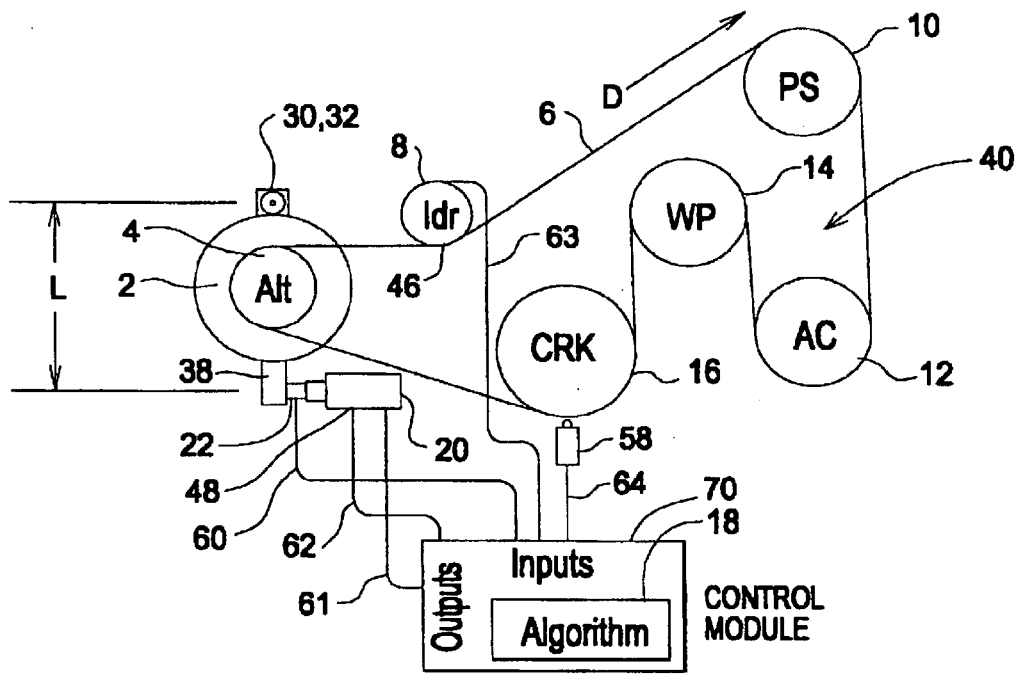
FIG. 1 is a schematic view of the inventive system.

FIG. 1 is a schematic view of the inventive system. The system anticipates and prevents belt slip in front end accessory drive systems thereby decreasing system noise and increasing belt life. The extent to which a belt may slip is dependent primarily on load and belt tension. A surface coefficient of friction on a belt and pulley(s) also plays a role. Belt slip is most readily identified by noise emitted by the belt during operation. Belt slip may also result in premature belt failure without causing noise, but as a result of increased belt temperature through friction between a belt and a pulley. Friction causes a belt temperature to rise to levels that are detrimental to long belt life. Belt slipping most often occurs during transients when system conditions are rapidly changing, for example engine accelerations and decelerations. To prevent this from occurring, the instant invention allows a belt operating condition, including a belt tension to be detected, analyzed and rapidly adjusted in order to prevent a belt slip condition.

The inventive system generally comprises a number of accessories being driven by an endless belt or drive member 6. The accessories driven by the belt are mounted to a front surface or surfaces of a vehicle engine. The accessories and belt may also be mounted to a frame, wherein the frame with the belt and accessories is then mounted as a complete unit to an engine surface.

The accessories comprise an alternator 2 (ALT) and pulley 4, idler 8 (Idr), power steering pump 10 (PS), air conditioner 12 (AC), water pump 14 (WP), and crankshaft pulley 16 (CRK), each accessory having a pulley engaged with the belt. The crankshaft pulley drives the belt in direction D, thereby driving the accessories. The pulley and belt may have any profile known in the art, including v-belt, multi-ribbed or toothed.

Alternator 2 comprises a frame that is pivotably mounted to an engine surface or base (not shown) at pivot 30. Alternator 2 also comprises arm 38 that is engaged at one end by actuator 20. Pivot 30 allows the alternator and thereby the pulley to be pivoted about pivot 30 by a movement of actuator 20. A pivoting movement of alternator 2 allows a belt tension to be adjusted.

Control module 18 comprises a computer processor capable of receiving and processing sensor signals received from sensors 22, 46, 48, and 58. It also generates and transmits control signals for controlling an actuator 20 movement and relative position. Sensor 22 is a load cell for detecting a load caused by a belt tension acting on the alternator arm 38. Sensor 46 detects a belt tension by detecting a load exerted on the idler 8 by a belt 6. Sensor 48 detects a displacement of the actuator 20. Sensor 58 detects a rotational speed of crankshaft pulley 16, which also equates to engine speed. Each sensor may comprise an analog or digital configuration, depending on a users needs.

Control module 18 is connected to sensors 22, 46, 48, 58 by wires 60, 63, 62, and 64 respectively. It is also electrically connected to actuator 20 by wire 61. The system may include sensors in addition to those described above. The additional sensors may provide other signals to the control module for adjusting a belt condition including ambient temperature and belt alignment. Each sensor may also comprise a RF transmitter with the control module comprising an RF receiver, thereby eliminating the need for physical connectors such as wires between the sensors and the control module.

Control signals are transmitted by control module 18 to actuator 20 through wire 61. Actuator 20 may comprise an electric motor, solenoid, or hydraulic cylinder or other form of mechanism known in the art that is capable of effecting a displacement or movement of arm 38 upon receiving a control signal from the control module.

Control module 18 may be programmable by a user thereby allowing a user to adjust operating parameters. The control module may also be 'hard-wired' and therefore unprogrammable by a user in the field. In either case the control module must be initially programmable to allow an instruction set to be initially loaded by means known in the art.

In operation, belt 6 is entrained on the drive system pulleys as shown in FIG. 1. Sensors 22, 46, 48, and 58 are installed at predetermined positions on the belt drive system. Sensor 46 detects a belt tension at idler 8. This is referred to as the "tight" side of the belt with respect to the alternator. Sensor 22 detects a load that is a function of a belt tension acting upon alternator pulley 4 and through a moment arm having a length L extending from pivot 30 to a point on arm 38. Sensor 48 detects a relative position of actuator 20. Sensor 58, which may comprise a tachometer, detects a crankshaft rotational speed.

Figure 2:
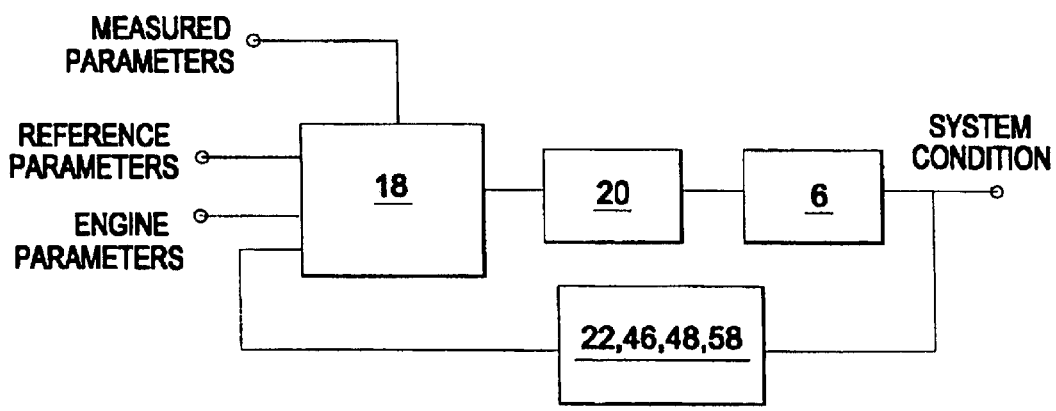
FIG. 2 is a schematic diagram of the closed loop control philosophy.

FIG. 2 is a schematic diagram of the closed loop control philosophy. Each sensor 22, 46, 48, and 58 transmits signals proportional to the load, tension, displacement or speed of the belt to the control module 18. The signals received by the control module from each sensor are compared to measured and calculated operating parameters or to parameters stored in a control module memory, more particularly, certain parameter reference values. The control module 18 then generates a control signal in response to the comparison of the stored reference parameters to the signal parameters. The resultant control module signal is transmitted to actuator 20 which moves to vary an alternator pulley position by partially rotating the alternator arm 38 about pivot 30. Movement of alternator 2 either increases or decreases a belt 6 tension. The change in a belt or engine operating condition, or increase or decrease in belt tension, is sensed by each sensor 22, 46, 48, 58 which then causes the cycle to repeat. This closed-loop system allows the control module to quickly and accurately control a belt tension in response to a measured belt tension. This allows 'real-time' adjustment of belt tension based upon operational need.

This represents a significant improvement over the prior art by increasing a belt life by allowing a belt tension to be maintained at a nominal level for most operating conditions, but then allowing a belt tension to be temporarily changed to prevent a belt slip or noise from occurring during transient conditions.

The magnitude of the change in a belt tension is adjustable based upon the operating condition prevailing at the time. For example, it may be necessary to increase a belt tension by 200N in certain high transient load conditions, while in other cases an increase of only 100N may be sufficient to prevent a belt slip or belt slip noise from occurring. In either case, the control module analyses the sensor signals and signals the actuator to set an appropriate arm 38 position and thereby an appropriate belt tension. Once the transient condition has passed the actuator position and hence belt tension is changed back to a nominal operating value. Typically the transients correspond to engine accelerations/decelerations and have durations on the order of a few seconds.

Measurable characteristics of the engine and belt drive system which serve to anticipate and quantify transient events may be programmed into the control module. These may include differential loads on each sensor based upon their respective locations in the system. These parameters may also include engine acceleration, and ambient temperature. As the belt and engine parameters vary, they are measured and transmitted by the sensors and received by the control module processor. The processor processes these sensor signals and sends a control signal to activate the actuator to either increase or decrease a belt tension before a belt slip or noise generating event occurs.

Figure 3:
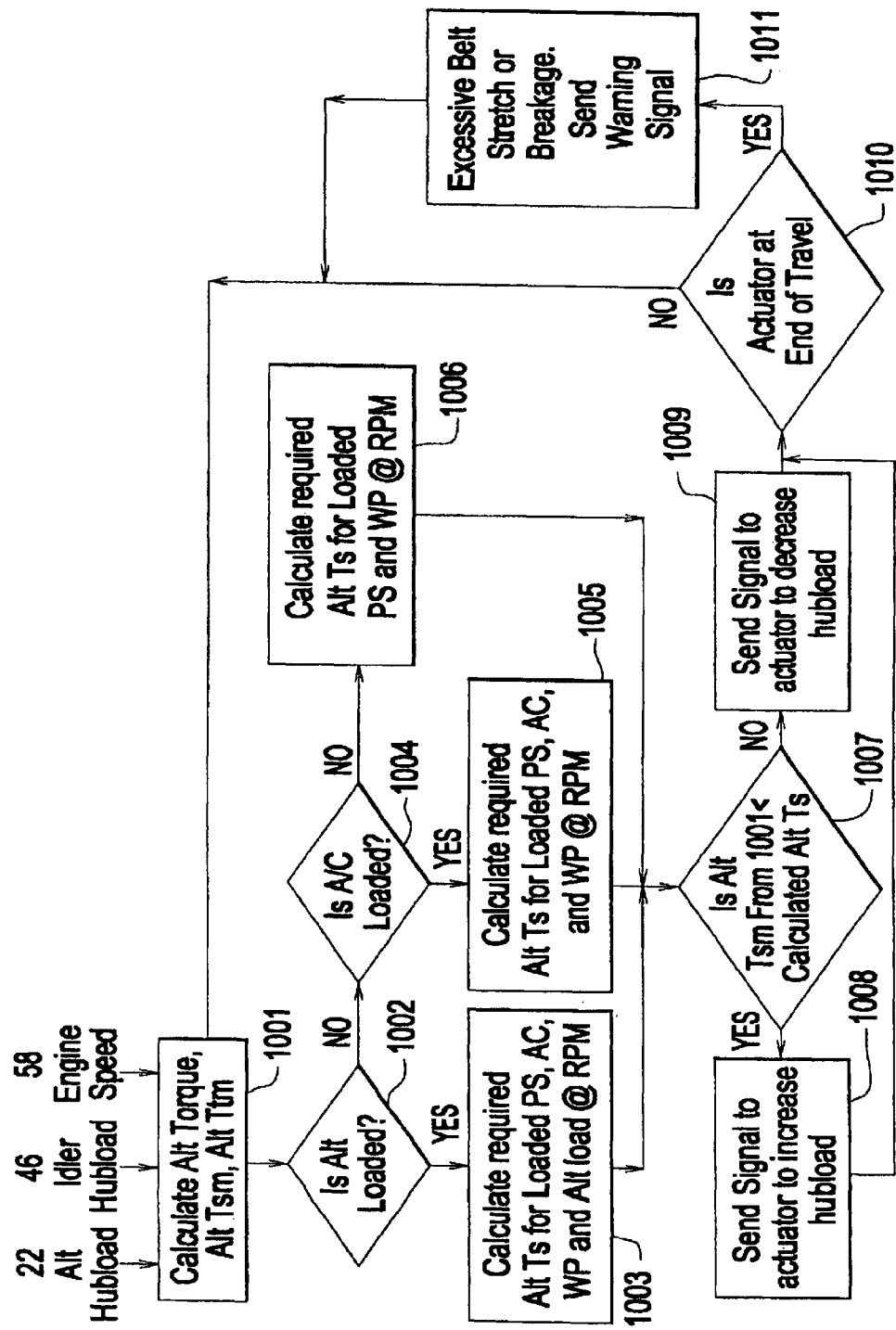
FIG. 3 is a control algorithm diagram for the inventive system.

By way of example, if a transient condition such as an engine acceleration is imminent, the control module may instruct the actuator to adjust a position to maintain or increase a belt tension before a belt slip occurs. For example, for an engine acceleration of 6000 RPM/sec, the acceleration duration is approximately 1 second. The required processing time for one complete cycle through the control loop in FIG. 3 is approximately 10–20 milliseconds. One cycle comprises the time required to sense the system condition, computate an appropriate actuator movement, move the actuator and then measure the changed system condition. One can readily appreciate this allows the system to operate at a rate of 50 to 100 adjustments per second, sufficient to control belt slip and belt tension. Consequently, a real-time, active control of a belt tension and thereby of a belt slip noise is realized by the instant invention.

To further enhance the active control feature of this invention the control module may be integrated with a vehicle central processing unit (CPU). In this embodiment the vehicle CPU is programmed to analyze engine and belt operating conditions that would be expected to cause belt noise. The engine operating conditions would comprise variables such as engine speed, engine acceleration, engine temperature, and ambient temperature. The vehicle CPU receives and processes signals for each variable noted above plus others including throttle position, transmission gear, electrical load, rotational speed of various accessory pulleys and so on. The system may also act to prevent a belt slip when a differential speed between the belt and an accessory pulley exceeds a predetermined value of any selected variable, including pulley speed. On receipt of a command signal from the vehicle CPU, through wire 70, the control module 18 signals actuator 20 to move if the control algorithm required such movement, thereby increasing or decreasing a belt tension. This would occur concurrently with the control module's analysis of the sensor signals. The vehicle command signal is reconciled with the control module control signal to avoid conflicting signals being transmitted to the actuator. In this embodiment the control module would not have a separate presence, instead being integrated within the vehicle CPU, requiring only a small portion of the overall vehicle CPU processing and memory capacity.

In another embodiment, the control module receives a plurality of signals of the type noted above from the vehicle CPU through wire 70. In this embodiment the control module is tasked with processing the vehicle CPU signals along with the sensor signals to generate a control signal. The control signal is transmitted to the actuator to adjust a belt tension.

In yet another embodiment the system may operate in an open loop mode whereby a control command is input to the control module. The control command may be pre-programmed, or such command can be input by an outside user, or received from another source such as the vehicle CPU. The control module processes the control command to generate a control signal that is transmitted to the actuator. No feedback is received from a separate sensor, so the system achieves an equilibrium state based on the changed position of the actuator. This embodiment allows a user to adjust a belt tension independently of the system operating parameters. The control module may also compare the control command to a known set of values stored in a memory in order to prevent overstressing the system causing premature belt failure.

FIG. 3 is a control algorithm diagram for the inventive system. The algorithm comprises a closed loop. Variables used in the diagram include "Ts" meaning alternator theoretical slack side tension required to prevent slip. Other variables are defined herein.

At 1001, inputs to the control module include an alternator hubload from sensor 22, an idler hubload from sensor 46, and an engine speed from sensor 58. These measured parameters are used to calculate an alternator torque, an alternator Tsm and alternator Ttm. "Hubload" refers the load imposed on a pulley by a belt tension.

The equations are:

$$T_{tm} = \frac{F_{Idr}}{2\operatorname{Sin}\left(\frac{\theta_{Idr}}{2}\right)} \text{ and,}$$

$$T_{sm} = \frac{H_{Alt}L_1 + \frac{L_2}{L_1}}{\operatorname{Sin}\left(\frac{\theta_{Alt}}{2}\right)} - T_{tm} \text{ and}$$

$$T_{Alt} = R_{Alt}(T_{tm} - T_{sm})$$

where,

Tsm=Alt slack side tension calculated from measured data
Ttm=Alt tight side tension calculated from measure data
$F_{Idr}$=Force measured at the idler
$H_{Alt}$=Alternator hubload
$L_1$=Distance from pivot to Alt pulley center
$L_2$=Distance from Alt pulley center to load cell
$\theta_{Idr}$=Idler pulley wrap
$\theta_{Alt}$=Alternator pulley wrap
$R_{Alt}$=Pitch diameter of alternator pulley
$T_{Alt}$=Alternator torque At 1002, the control module determines if the alternator is loaded or unloaded, based upon alternator Tsm and Ttm calculated at 1001. The "alternator load" measurement comprises the electrical load imposed upon the alternator by operation of the vehicle of which it is a part.

If the alternator is loaded, at 1003 the control module calculates the required alternator Ts, or slack side tension, for a loaded system. In this case the loaded system includes a loaded power steering pump, air conditioner, water pump and alternator at the specific engine speed. At 1007, the control module determines if the alternator Tsm from 1001 is less than the calculated alternator Ts at 1003, for this condition. If the answer is "yes" then the control module will send a signal to increase the alternator hubload, see 1008, by activating actuator 20. If the answer is "no" the control module sends a signal to decrease the alternator hubload, see 1009, by activating actuator 20. Sensor 22 provides actuator position signals at 1010 in response to a movement of the actuator.

At 1010 a signal is received by the control module from sensor 48 to determine if the actuator has reached either of its travel limits. If the answer is "yes", a warning signal will be generated to indicate either excessive belt stretch or breakage, see 1011. If the answer is "no" then the loop repeats beginning with 1001. Sensor 48 and the associated travel limits are set after the belt is installed and properly tensioned.

Returning to 1002, if the alternator is not loaded, the control module determines whether or not the air conditioner is loaded, see 1004. In this case "air conditioner load" refers to the air conditioner compressor being in service.

If the air conditioner is loaded, at 1005 the control module calculates the required alternator Ts for a loaded system. The loaded system in this case includes a loaded power steering pump, air conditioner, and water pump under load at the specific engine speed with the alternator unloaded. At 1007, the control module determines if the alternator Tsm from 1001 is less than the calculated alternator Ts at 1005, for this operating condition. If the answer is "yes" then the control module will send a signal to increase the alternator hubload, see 1008, by activating actuator 20. If the answer is "no" the control module sends a signal to decrease the alternator hubload, see 1009, by activating actuator 20. As described above, at 1010 a signal is received by the control module to determine if the actuator has reached either of its travel limits. If the answer is "yes", a warning signal will be generated to indicate either excessive belt stretch or breakage, see 1011. If the answer is "no" then the loop repeats beginning with 1001.

Returning to 1004, if the air conditioner is not loaded the control module calculates the required alternator Ts for the system with the loaded power steering and water pump loaded at the measured engine speed, see 1006. At 1007 the control module determines if the measured alternator Tsm is less than the calculated alternator Ts for this condition. If the answer is "yes" then the control module will send a signal to increase the alternator hubload, see 1008, by activating actuator 20. If the answer is "no" the control module sends a signal to decrease the alternator. hubload, see 1009, by activating actuator 20. Sensor 22 provides actuator position signals at 1010 in response to a movement of the actuator. As described above, at 1010 a signal is received by the control module to determine if the actuator has reached either of its travel limits. If the answer is "yes", a warning signal will be generated to indicate either excessive belt stretch or breakage, see 1011. If the answer is "no" then the loop repeats beginning with 1001.

One can appreciate that the system described herein can include additional belt driven accessories, including an air compressor or mechanical fuel pump. It may also include multiple belt trains, each driven by a crankshaft pulley and each comprising a pivoted pulley and actuator.

Although a single form of the invention has been described herein, it will be obvious to those skilled in the art that variations may be made in the construction and relation of parts without departing from the spirit and scope of the invention described herein.

We claim:

1. A system for controlling an endless drive member tension comprising:

a endless drive member having a drive member tension;

a first sensor detecting the drive member tension through an idler pulley and having a sensor signal;

an accessory connected to a frame, the frame having a pivotal. engagement on a mounting surface, the accessory engaged with the drive member;

a moveable member engaged with the frame;

a second sensor detecting a position of the moveable member;

a module receiving the first sensor signal and second sensor signal, the module processing the signals and thereby generating a control signal; and the moveable member receiving the control signal, whereby the moveable member movement adjusts a drive member tension by pivotal movement of the frame.

2. The system as in claim 1, wherein the module comprises a control module having a computer processor.

3. The system as in claim 1, wherein the moveable member comprises a hydraulic actuator.

4. The system as in claim 3, wherein the drive system comprises an accessory drive system for an engine.

5. The system as in claim 1 wherein the accessory comprises an alternator.

6. A method of preventing a belt slip comprising the steps of:

operating a drive having a belt engaged with a first accessory and a second accessory, said belt having a tension;

measuring a first accessory hubload, a second accessory hubload and a second accessory rotational speed;

calculating a first accessory slack side tension using a first accessory hubload, a second accessory hubload and a second accessory rotational speed;

detecting a first accessory load condition;

calculating a first accessory belt slack side tension using a first accessory load condition;

comparing a calculated first accessory belt slack aide tension using a first accessory load condition to a calculated first accessory belt slack aide tension using a first accessory hubload, a second accessory hubload and a second accessory rotational speed; and adjusting a belt tension by a pivotal movement of the first accessory.

7. The method as in claim 6 further comprising the step of:

comparing the belt tension to a parameter stored in a memory device.

8. The method as in claim 6 further comprising the step of:

detecting a belt tension with a sensing member.

9. The method as in claim 6 further comprising the step of:

moving a rotating member engaged with the belt to adjust a belt tension.

10. The method as in claim 6 further comprising the step of:

training the belt about at least two pulleys.

11. The method as in claim 9 further comprising the step of:

preventing a belt slip.

12. The method as in claim 9 further comprising the step of:

preventing a belt noise.

13. A system for controlling an endless drive member tension comprising:

an endless drive member having a drive member tension manifest at an idler pulley as ($F_{Idr}$);

a first sensor detecting ($F_{Idr}$) and generating a first sensor signal;

an alternator connected to a frame, the frame having a pivotal engagement on a mounting surface, the alternator engaged with the drive member;

a moveable member engaged with the frame;

a second sensor detecting a position of the moveable member;

a module receiving the first sensor signal and second sensor signal, the module generating a control signal wherein $$T_{tm} = \frac{F_{Idr}}{2\sin\left(\frac{\theta_{Idr}}{2}\right)} \text{ and}$$

$$T_{sm} = \frac{H_{Alt}L_1 + \dfrac{L_2}{L_1}}{\sin\left(\dfrac{\theta_{Alt}}{2}\right)} - T_{tm}, \quad \text{and}$$

$$T_{Alt} = R_{Alt}(T_{tm} - T_{sm})$$

where $T_{sm}$=Alt slack side tension calculated from measured data
$T_{tm}$=Alt tight side tension calculated from measure data
$F_{Idr}$=Force measured at the idler
$H_{Alt}$=Alternator hubload
$L_1$=Distance from pivot to Alt pulley center
$L_2$=Distance from Alt pulley center to load cell
$\theta_{Idr}$=Idler pulley wrap
$\theta_{Alt}$=Alternator pulley wrap
$R_{Alt}$=Pitch diameter of alternator pulley
$T_{Alt}$=Alternator torque
where "Alt" refers to an alternator; and
the moveable member responsive to the control signal, whereby a moveable member movement adjusts an alternator hubload ($H_{Alt}$) and thereby ($F_{Idr}$) by pivotal movement of the frame.

14. The system as in claim 13, wherein the moveable member comprises an electric actuator.

15. The system as in claim 13, wherein the drive system comprises an accessory drive system for an engine.

* * * * *